Jan. 2, 1934.  R. R. McDONELL  1,941,613
PRESSURE GAUGE STABILIZER
Filed Sept. 23, 1932
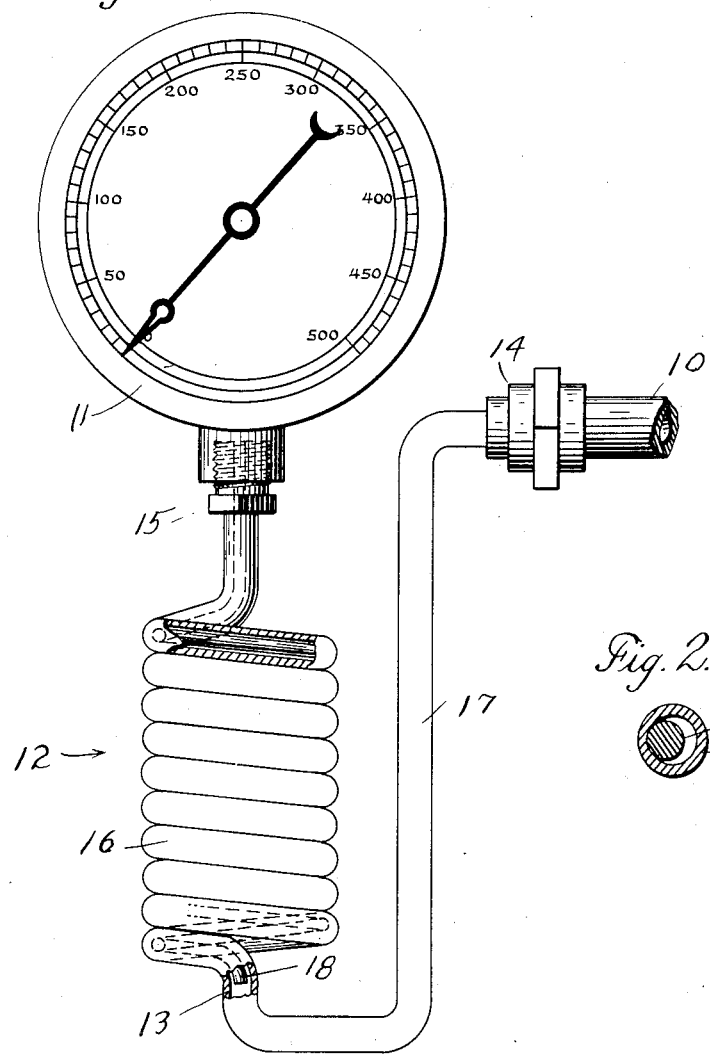
INVENTOR
*Rob Roy McDonell*
BY
*Robert A Lavender*
ATTORNEY Patented Jan. 2, 1934

1,941,613

UNITED STATES PATENT OFFICE 1,941,613

PRESSURE GAUGE STABILIZER

Rob Roy McDonell, Oakland, Calif.

Application September 23, 1932
Serial No. 634,573

2 Claims. (Cl. 137—111)

(Granted under the act of March 3, 1883, as
amended April 30, 1928; 370 O. G. 757)

This invention relates to a pressure gauge stabilizer and has for an object to provide a tube pressure gauge stabilizer which is to be inserted between the pressure line and the gauge indicator so as to eliminate vibration and sudden variation of the gauge needle.

A further object of this invention is to provide a pressure gauge stabilizer which will connect the pressure line and a gauge indicator by a tubing having in effect a very small bore, which tubing, however, is not liable to be clogged up by a small piece of foreign matter.

A further object of this invention is to provide a pressure gauge stabilizer or shock absorber which will prevent pump pulsations, sudden shock, or change of pressure from unduly affecting the operation of the gauge, pressure indicator, pilot valve, the pump governor, or whatever device it is used with.

With the above and other objects in view the invention consists in the construction, combination and arrangement of parts as will be described more fully hereinafter.

Reference is to be had to the accompanying drawing forming a part of this specification in which like reference characters indicate corresponding parts throughout the several views, and in which:

Fig. 1 is a plan view of the stabilizer or shock absorber as applied to a pressure gauge; and Fig. 2 is a sectional view through the tubing of the stabilizer of Fig. 1.

There is shown at 10 a pressure line which is ordinarily connected directly to the pressure indicator at 11. Interposed between the pressure line 10 and the pressure gauge indicator 11 is the stabilizer or shock absorber 12 constituting this invention. This stabilizer or shock absorber includes a section of tubing 13 connected at one end by means of a reducer union 14 to the pressure line 10 and at the other end by means of a reducer union 15 to the pressure gauge indicator 11. The tubing 13 is formed into a coil section 16 and a straight section 17, the coil 16 and straight section 17 forming a trap.

A piece of wire 18 of a diameter slightly less than the internal diameter of the tubing 13 is placed within the coil section 16 and coiled therewith. For example, if pressures up to 200 pounds are to be used, the coil 16 will contain about five feet of wire and tubing. The tubing will have about five-sixteenths of an inch external diameter and about three-sixteenths of an inch internal diameter, while the diameter of the wire 18 will be about one-eighth of an inch. The trap formed by the coil 16 and the straight section 17 will then be filled with heavy lubricating oil to eliminate air between the gauge and the coil. For higher pressures longer sections of tubing and wire will be used.

Although this invention has been illustrated as being applied between the pressure line and the pressure gauge indicator it may be used in air, steam, water, oil, or hydraulic systems where it is desirable to prevent pump pulsations, sudden shocks, or changes of pressure from unduly affecting the operation of gauges, pressure regulators, pilot valves, pump governors, etc.

The pressure in the line 10 will be transmitted through the heavy oil contained in the trap formed by the coil 16 and straight section 17 to indicate accurately on the pressure gauge 11. Any sudden increase in pressure in the line 10 will likewise be transmitted, but will be transmitted more slowly so as to allow the indicator 11 to vary in order to indicate the new pressure but not to vary so suddenly as to chatter or indicate the pressure inaccurately.

Should any foreign matter get into the line 10 and succeed in penetrating into the oil in the straight section 17 as far as the end of the wire 18, it would still not affect the operation of the device unless it is of such diameter as to completely fill the tubing 13. Thus, although the cross section of the foreign matter may be much greater than the cross section of the space between the wire 18 and the tubing 13 in coil 16, yet the pressure will be indicated accurately in spite of the presence of such foreign matter.

In the prior art shock absorbers or stabilizers have been provided, having a section of tubing of very small cross section but the presence of such a small cross section of tubing makes it very liable to be blocked by foreign matter which is not true of the present device.

It will be understood that the above description and accompanying drawing comprehend only the general and preferred embodiment of this invention, and that various changes in construction, proportion and arrangement of parts may be made within the scope of the appended claims, and without sacrificing any of the advantages of this invention.

The herein described invention may be manufactured and used by or for the Government of the United States of America for governmental purposes without the payment of any royalties thereon or therefor.

I claim:

1. A stabilizer or shock absorber for pressure gauges and the like, comprising a length of tubing and an upwardly disposed section of tubing connected together so as to form a trap, a length of wire extending through said length of tubing, the diameter of said wire being somewhat less than the diameter of said tubing.

2. A stabilizer or shock absorber for pressure gauges and the like, comprising a coil of tubing and an upwardly disposed section of tubing connected together so as to form a trap, a coil of wire extending through said coil of tubing, the diameter of said wire being somewhat less than the diameter of said tubing, said trap being adapted to be filled with a supply of heavy lubricating oil.

ROB ROY McDONELL.